United States Patent
Wilkie et al.

(10) Patent No.: US 6,538,598 B1
(45) Date of Patent: *Mar. 25, 2003

(54) APPARATUS AND METHOD FOR LIQUID LEVEL MEASUREMENT IN A SOUNDING TUBE

(75) Inventors: Neil T. Wilkie, Hamilton, OH (US); Michael L. Topputo, West Chester, OH (US)

(73) Assignee: Ohmart VEGA Corporation, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/027,690

(22) Filed: Dec. 21, 2001

Related U.S. Application Data

(62) Division of application No. 09/941,555, filed on Jan. 26, 2000, now Pat. No. 6,337,655.

(51) Int. Cl.[7] .......................... G01S 13/08; G01S 15/08; G01F 23/00
(52) U.S. Cl. ...................... 342/124; 367/908; 73/290 V
(58) Field of Search .................... 342/123, 124; 73/290 V, 290 R, 291; 367/99, 908

(56) References Cited

U.S. PATENT DOCUMENTS

| | | | |
|---|---|---|---|
| 4,170,765 A | 10/1979 | Austin et al. | 367/100 |
| 5,703,289 A * | 12/1997 | Mulrooney | 333/252 |
| 6,292,131 B1 * | 9/2001 | Wilke et al. | 342/124 |
| 6,337,655 B1 * | 1/2002 | Wilkie et al. | 342/124 |
| 6,393,909 B1 * | 5/2002 | Fahrenbach et al. | 333/252 |

* cited by examiner

Primary Examiner—Ian J. Lobo
(74) Attorney, Agent, or Firm—Wood, Herron & Evans, L.L.P.

(57) ABSTRACT

A level sensing apparatus for attachment to a vessel to measure levels of contents in a tank of the vessel. The level sensing apparatus includes a housing, a transmitter disposed within and operatively connected to said housing, and an antenna operatively connected to the transmitter for directing electrical and/or mechanical waves in a direction away from the transmitter. The antenna is further adapted to receive electrical and/or mechanical waves. The level sensing apparatus further includes a mounting system affixing the level sensing apparatus to a vessel. The mounting system is adapted such that the mounting system can be placed in a first position while the transmitter is affixed to the vessel, wherein levels of contents in a tank can be measured with electrical and/or mechanical waves, or in a second position while the transmitter is affixed to the vessel, wherein levels of contents in a tank can be measured manually.

44 Claims, 3 Drawing Sheets

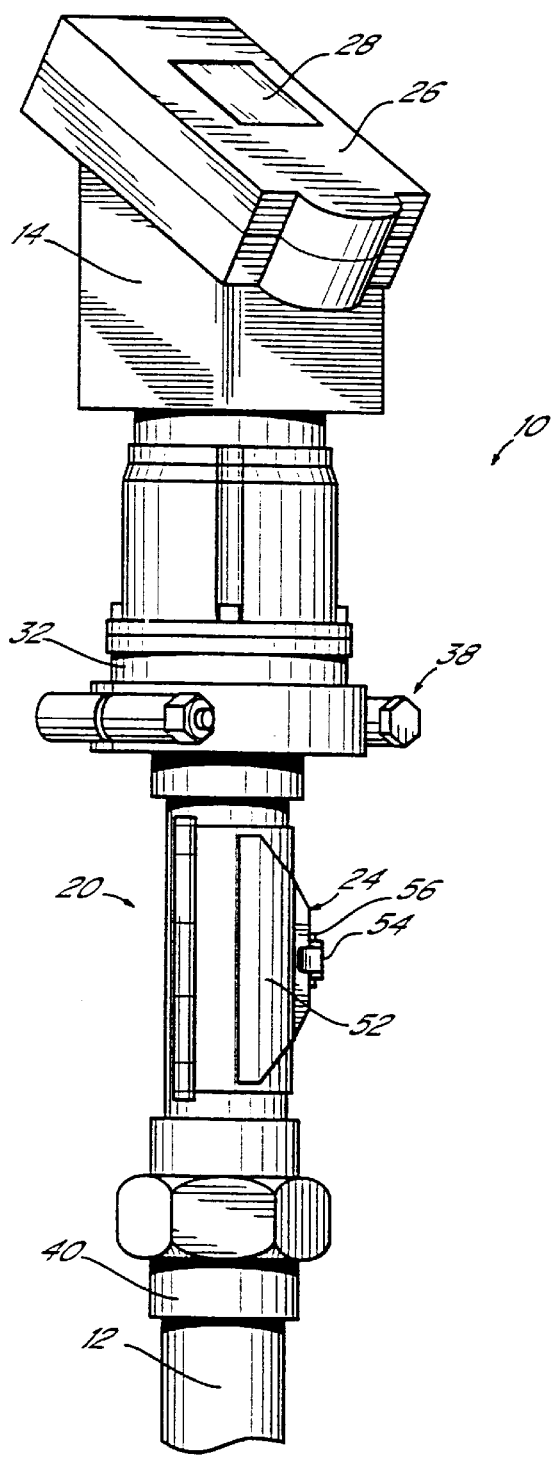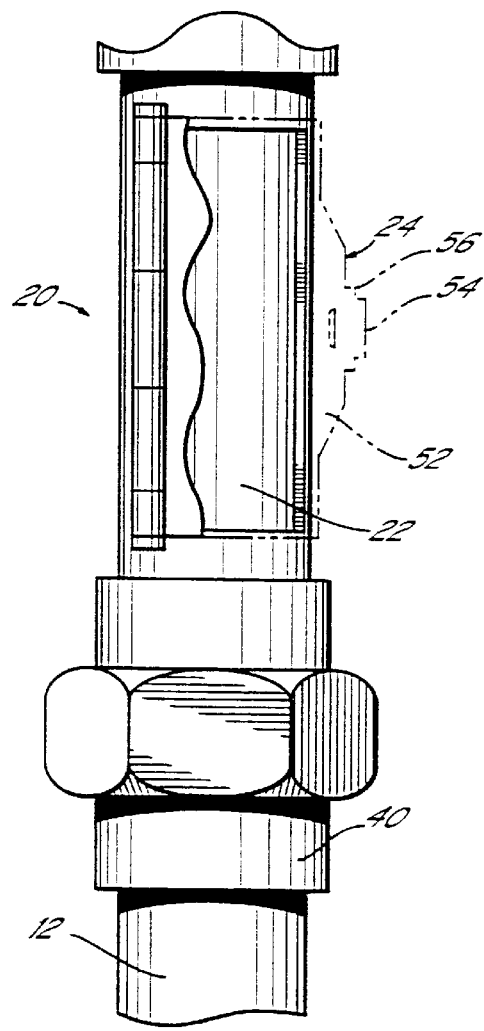
FIG. 1
FIG. 2

APPARATUS AND METHOD FOR LIQUID LEVEL MEASUREMENT IN A SOUNDING TUBE

CROSS-REFERENCE TO RELATED APPLICATIONS

This application is a divisional of U.S. Ser. No. 09/491,555 filed Jan. 26, 2000 now U.S. Pat. No. 6,337,655, now allowed, by Neil T. Wilkie et al., which is hereby incorporated by reference herein in its entirety.

This application cross-references U.S. Pat. No. 6,292,131, by Neil T. Wilkie et al. filed Sep. 29, 2000.

FIELD OF THE INVENTION

The present invention relates to pulse radar measurement of liquid levels within process and storage tanks.

BACKGROUND OF THE INVENTION

In many environments, various materials are stored and/or processed in tanks prior to or during their disposition. These materials include foods, beverages, pharmaceuticals and fuels. One particular and commonly-known use of such tanks involves the storage of fuel for various modes of transportation. These fuel tanks can range from a gas tank on a car to voluminous fuel tanks such as those located on Naval ships. In particular aircraft carriers house multiple fuel tanks. These are used to store jet fuel for the aircraft carried on the ship.

Regarding these fuel tanks on Naval ships, the ability to reliably determine the amount of the contents stored within a tank at any given time can be critical. Military readiness is often dependent on an adequate fuel supply. Additionally, accurate measurements of fuel usage directly translate into cost effectiveness in procuring a fuel supply for ships. As such, there are several benefits to accurately and reliably gauging the levels of fuel in these tanks. Thus, the Navy employs redundant measurement methods to determine and cross-check the fuel levels.

Methods for the determination of liquid levels may include visual examination or the use of various apparatus that gauge the level of the fuel. Current electronic measurement methods include differential pressure and magnetic float transmitter technologies, both of which rely on sensor contact with the process medium. However, several factors, both in the structure of the tanks and in the methods of measurement used, increase the difficulty in obtaining an accurate and reliable level reading. In the particular situation of jet fuel tanks of Navy ships, any visual reading is obstructed by the location of the tanks within the bowels of the ship and by the voluminous size of the tanks. Additionally, visual inspection of content levels lacks accuracy and can be time consuming. In order to avoid the problems attendant visual examination, various apparatus may be used to measure content levels in fuel storage tanks.

Differential pressure transmitters measure static pressure head of the liquid in the tank and pressure (if any) of gasses above the liquid. The arithmetic difference between these values is used to determine the liquid level. This is an inherently unreliable and inaccurate method because it depends on sensor location, ship motion and is an "inferred" level based on two other measurement.

Magnetic floats are mechanical in nature and involve a ball or buoy floating on the surface of the liquid, typically in a guide or sleeve mounted to the tank wall. These systems require cumbersome incremental metered filling of the tank to establish electrical resistance values that correspond to tank level. They are also prone to expensive clogging failures which require expensive invasive repair work.

However, certain additional problems, some of which are particular to jet fuel tanks on Naval ships, arise from the current manual back-up method and apparatus used for measurement of these liquid levels. Fuel measurement on Naval ships is performed manually through a sounding tube with a plumb line including an attached plumb bob. The sounding tube is commonly a one-and-one-half inch diameter pipe located as part of the infrastructure of the ship. The sounding tube extends within the fuel tank and is open to its contents. Thus, the liquid level within the sounding tube equals the liquid level within the fuel tank. This sounding tube is not necessarily a linear pipe, but may include bends in order to avoid various other infrastructure of the ship.

To measure fuel levels, the top of the sounding tube is opened. The plumb bob is then dropped through the interior of the sounding tube to the bottom of the sounding tube. Once the plumb bob is retracted from the bottom of the sounding tube using the plumb line, the liquid level may be read from the moisture level created by the fuel on the plumb line.

Certain problems arise from the plumb line method of liquid level measurement. First, jet fuel is clear and evaporates very rapidly, thereby enhancing the difficulty of accurately reading the plumb line to determine the associated moisture level. Second, the plumb bob may break off the plumb line during use. Due to the difficulty involved, as a practical matter detached plumb bobs are not retrieved from sounding tubes. As a result, subsequent plumb bobs used for measurement may be impeded from falling to the bottom of the sounding tube, resulting in reduced measurement range.

SUMMARY OF THE INVENTION

The present invention improves aforementioned primary contact methods of level measurement by using a non-contact level sensing gauge apparatus on a sounding tube to measure liquid levels in fuel tanks. There are several types of level sensing gauges. Examples include those that use radar transmitters, or ultrasonic waves. A high degree of accuracy has been achieved by the use of level-sensing gauges which monitor content levels by transmitting microwave pulses from an antennae toward the surface of the tank contents. These pulses are reflected from the contents and back to the antennae. Other radar gauges use a continuous wave rather than pulses. Radar signals are unaffected by noise, by extreme air turbulence, or by fluctuations in dielectric constant above a nominal minimum value, density, or conductivity. Even liquids having highly agitated surfaces or gas bubbles are usually reliably measured. Gas layering such as that produced by solvents or gases has virtually no adverse effect. Radar sensors are suitable for liquids, solids, powders, granules, dust, corrosive steam and vapors, regardless of the media characteristics, environment, low and high pressures or temperatures. As such, they are adequate for use in the sensing of the fuel level in tanks of Naval ships.

To this end, the present inventors devised the use of a non-contact radar level sensing gauge on the sounding tubes of Naval ships. However, problems again arise when attempting the back-up manual sounding method of level measurement, as is the practice in the Navy. For instance, removal of the level sensing gauge from the sounding tube in order to use the plumb line is unwieldy and time consuming.

Potential solutions include the use of a "Y"-shaped fitting attached to the end of the sounding tubes. In this configuration, a level-sensing gauge is attached to one branch of the "Y" to measure liquid levels by radar pulse while a plumb line could be simultaneously inserted through the second branch. However, the "Y"-shape of the fitting may disrupt the pulse radar of the level-sensing gauge, resulting in inaccurate readings.

The present invention permits level measurement of fuel tanks on Naval ships while providing simple secondary access for manual sounding that does not require removal of the radar instrument. Additionally, the present invention is not susceptible to the above-discussed sources of inaccuracy. Further, the present invention allows multiple methods of liquid level measurement to be used, each without affecting the accuracy of the other, and while reducing or eliminating the other aforementioned reliability and service drawbacks of contact methods.

This invention thus solves the problems associated with known apparatus and methods for measuring levels of contents within storage tanks. The apparatus of this invention also satisfies the aforementioned needs that exist in the art as developed in the background of the invention.

The level sensing apparatus of the present invention includes two main components: (1) the radar level sensor itself and (2) a sounding tube adapter. The level sensor includes a transmitter disposed within a housing and an antenna, which is operatively connected to the transmitter. The transmitter emits the electrical and/or mechanical waves through the antenna. These waves are subsequently reflected from a surface and received by the antenna to measure the level of a certain substance, such as fuel, in a given container. In a radar level sensing gauge, the microwave pulses of radar travel down a waveguide and are subsequently reflected off the contents of the tank and return to the antennae via the waveguide. In the present invention, the sounding tube is used as a waveguide. The sounding tube adapter is operatively connected to the base of the housing of the level sensor. This sounding tube is analogous to a waveguide in the present application.

The level sensor is operatively connected to the sounding tube adapter by a tri-clamp which encompasses and tightens against a first flange that is integral with and circumferential about the housing, and a second flange that is integral with and circumferential about the sounding tube adapter. The level sensing apparatus, which includes the level sensor and sounding tube adapter, may then be mounted to a sounding tube through the use of a union fitting. The union fitting is threaded, including female threads which are compatible with the male threads of the sounding tube. A gasket in the union fitting forms a seal between the top of the sounding tube and the apparatus. Should the housing of the level sensor need to be rotated during use in order to open the top or to more easily view the LCD readout, the housing may be rotated without removing the apparatus from the sounding tube by loosening the tri-clamp.

In attaching the level sensing apparatus of the present invention to a sounding tube, the union fitting is first attached to the sounding tube as described above. The sounding tube adapter with attached level sensor is then screwed onto the union fitting. When properly attached, the antenna of the level sensor extends below the base of the housing of the level sensor, and is thus disposed within the sounding tube adapter. The configuration of a level sensing apparatus on a sounding tube allows for very accurate non-contact measurement of liquid levels in fuel tanks.

In another aspect of the present invention, the sounding tube adapter further includes an orifice disposed in its sidewall. This orifice may be covered by a latch door. This includes a door, latch and cotter pin which is used to seal tightly against the orifice in the housing wall of the sounding tube adapter. By opening and closing the latch door, the orifice may be exposed to allow measurement of liquid levels by use of a plumb line. When this door is opened, and the orifice exposed, plumb line measurement may be performed without the need of removing the level sensing apparatus from the sounding tube. This minimizes time and expense in measurement. When closed, the latch door seals tightly against the wall of the housing of the sounding tube adapter, thereby allowing for very accurate and reliable radar measurement. The use of the latch door also eliminates the need for a "Y"-shaped fitting which would interfere with radar pulses, thereby reducing the accuracy of liquid level measurement.

Thus, in accordance with the present invention, when the latch door is in its closed position, the pulse radar of the level sensing gauge travels the sounding tube unimpeded, thereby resulting in a very accurate and reliable reading of the fluid level. The latch door and orifice in the sounding tube also prevent the need for removing the level sensing gauge from the sounding tube in order to measure fluid levels manually. This eliminates a cumbersome and time consuming process. Additionally the use of the apparatus of the present invention reduces the health hazards attendant the measuring process by minimizing the amount of noxious fumes which emit from the sounding tube.

By virtue of the foregoing, there is thus provided an apparatus and method for liquid level measurement in a sounding tube. The aforementioned and other advantages of the present invention shall be apparent from the accompanying drawings and description thereof.

BRIEF DESCRIPTION OF THE DRAWINGS

FIG. 1 is a perspective view of the level sensing apparatus of the present invention depicting the latch door of the sounding tube adapter in its closed and sealed position.

FIG. 2 is a partial cutaway view of the sounding tube adapter of the apparatus of the present invention depicting the orifice in the sidewall of the adapter.

DETAILED DESCRIPTION

Figure 2A:
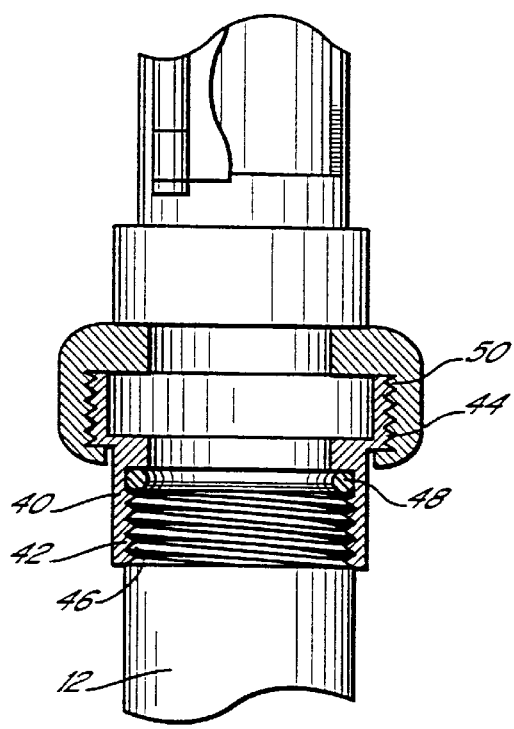
FIG. 2A is a cutaway view depicting the interaction of the union fitting, sounding tube and sounding tube adapter in accordance with the principles of the present invention.

Referring to the Figures, and in accordance with the principles of the present invention, a level sensing apparatus 10 is provided for attachment to a sounding tube 12 in order to measure levels of contents in a tank. This level sensing apparatus 10 includes a housing 14 for enclosing the various components of the level sensing apparatus 10. These components include a transmitter 16 disposed within and attached to the housing 14 and an antenna 18 disposed within the housing 14 and operatively connected to the transmitter 16 for directing electrical or mechanical waves in a direction away from the transmitter 16. This transmitter 16 may be a microwave transmitter, such as Ohmart-VEGA part number Vegapuls 54 KEX.MD, commercially available from Ohmart-VEGA, Cincinnati, Ohio. The antenna 18 is further adapted to receive electrical or mechanical waves. The level sensing apparatus 10 of the present invention also includes a sounding tube adapter 20 operatively connected to the housing 14 and is further adapted for attachment to a sounding tube 12. Additionally, the sounding tube adapter 20 includes an orifice 22 disposed through its sidewall. This orifice 22 may be sealed off by a cover 24.

Figure 4:
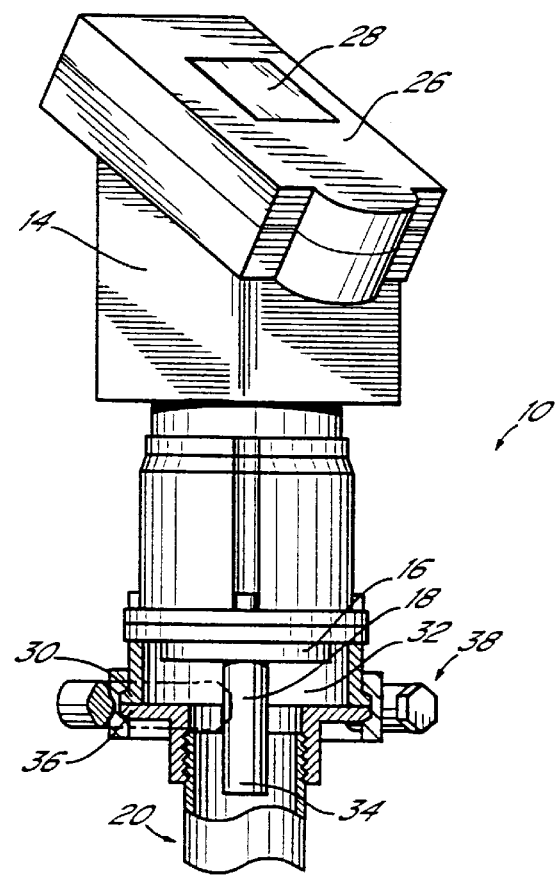
FIG. 4 is a cutaway view depicting the interaction of first and second annular flanges and tri-clamp used in attaching the housing to the sounding tube adapter.

More particularly, and referring to FIGS. 1, 2, and 4 the pulse radar level sensing apparatus 10 of the present invention includes an enclosed housing 14, which forms a chamber for containing a transmitter 16 and antenna 18 of the apparatus 10. The housing 14 is preferably made of plastic and includes a hinged removable lid 26 for access to the components of the transmitter 16. The housing 14 additionally includes a display screen 28, that an operator may read the measurement of liquid levels in a tank. A first annular flange 30 for connection of the housing 14 to a sounding tube adapter 20 of the level sensing apparatus 10 is disposed about the base 32 of the housing 14. The transmitter 16 is disposed within and attached to the housing 14. The antenna 18 is disposed at least partially within the housing 14 and is operatively connected to the transmitter 16. The transmitter 16 generates electrical or mechanical waves used for measurement and the antenna 18 directs these waves in a direction away from the transmitter 16. These waves may be of various types, including radar or ultrasonic waves. In one embodiment of the present invention, microwave radar pulses are used. Other apparatus may use a continuous wave as opposed to radar pulses. Following their transmittal, these waves are reflected off a surface to be measured and subsequently returned to the level sensing apparatus 10. The antenna 18 is adapted to receive these reflected electrical or mechanical waves.

The sounding tube adapter 20 of the level sensing apparatus 10 is operatively connected to and extends from the base 32 of the housing 14. This sounding tube adapter 20 sheaths the distal end 34 of the antenna 18, which protrudes below the open base 32 of the housing 14. The sounding tube adapter 20 is in the form of a single piece and further includes a second annular flange 36 located proximal to the base 32 of the housing 14. This second annular flange 36 has application in connection of the sounding tube adapter 20 to the housing 14 of the level sensing apparatus 10 of the present invention. The shape of the flange 36 aids in forming the seal between the housing 14 and sounding tube adapter 20. The housing 14 is attached to the sounding tube adapter 20 through the use of these first and second annular flanges 30, 36 which are integral and circumferential about both the housing 14 and adapter 20, respectively. The flanges 30, 36 are first placed in a superimposed relationship with one another. Next, the connection and cooperation of the first and second annular flanges 30, 36 is facilitated by the use of a tri-clamp 38 which holds the first flange 30 of the housing 14 against the second flange 36 of the sounding tube adapter 20. This clamp 38 may be a Tri-clamp, which is commercially available from Tri-Clover, Inc., Kenosha, Wis., or any other commercially available suitable clamp. Following attachment, this tri-clamp 38 can be loosened in order to rotate the housing 14 of the level sensing apparatus 10, as may be necessary. The end of the sounding tube adapter 20 including the second annular flange 36 is located proximate with and in a superimposed relationship to the first annular flange 30 on the base of the housing 14 following completed assembly of the level sensing apparatus 10.

The aforementioned distal end 34 of the antenna 18 is housed within the sounding tube adapter 20 and the antenna 18 transmits and receives radar such as microwave pulses to and from the surface of the contents of a tank. More specifically, the distal portion of the antenna 18 of the level sensing apparatus 10 extends forwardly from the base of the housing 14 and is circumferentially enclosed by the sounding tube adapter 20, which forms a sheath about the longitudinal axis of the antenna 18. The antenna 18 then directs electrical or mechanical waves into a storage tank or, in the case of the present invention, into a sounding tube 12. Thus, for use of the level sensing apparatus 10 on a sounding tube 12, in accordance with the principles of the present invention, the apparatus 10 is attached to a sounding tube 12.

Figure 3:
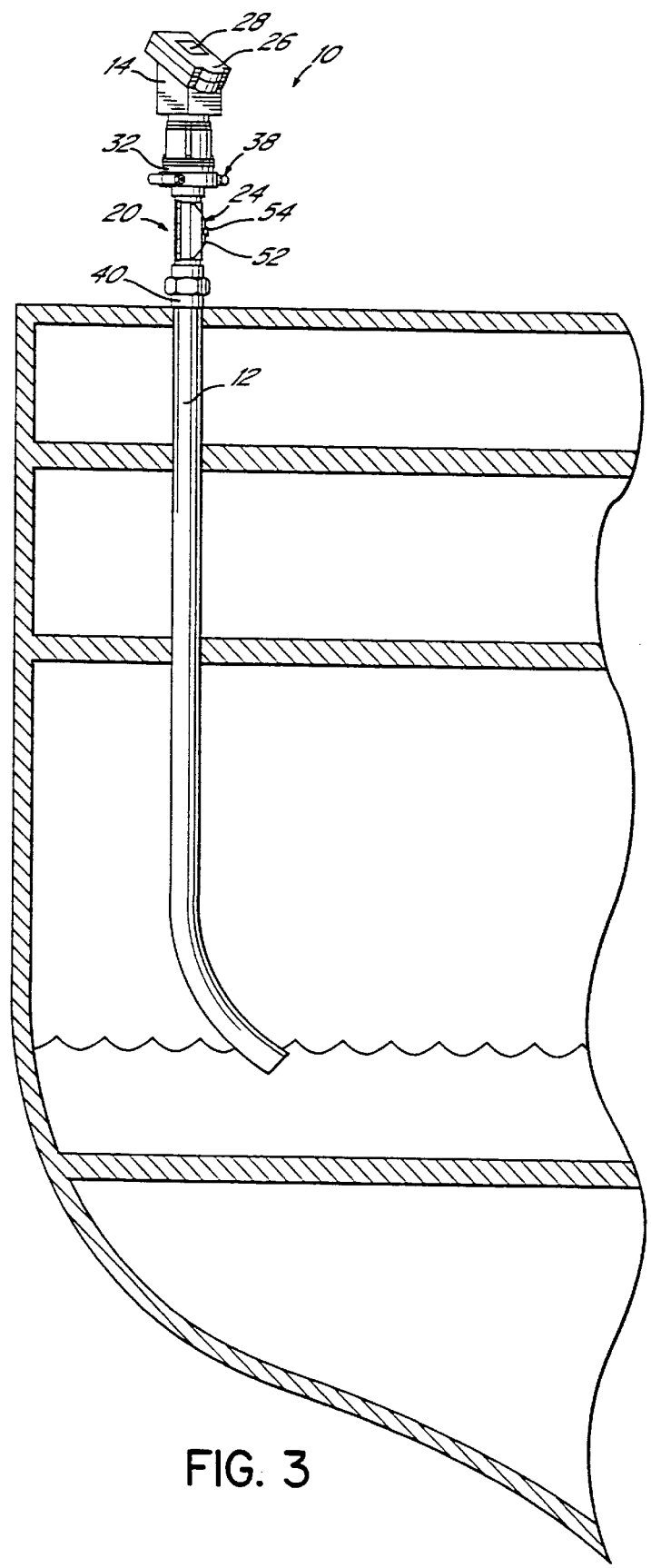
FIG. 3 is a perspective view depicting the level sensing apparatus attached to a sounding tube in accordance with the principles of the present invention.

This attachment is facilitated by a union fitting 40 located at and operatively connected to the end of the sounding tube adapter 20 distal to the housing 14 of the level sensing apparatus 10. Referring to FIG. 3, this union fitting 40 is instrumental in the attachment of the level sensing apparatus 10 to a sounding tube 12. The sounding tube 12 to which the level sensing apparatus 10 is attached acts as a waveguide for directing microwave radar pulses into and receiving microwave radar pulses from the contents of the tank. Attachment of the level sensing apparatus 10 to the sounding tube 12 occurs through the use of corresponding male and female threads which are disposed on the surfaces of the union fitting 40, sounding tube 12, and sounding tube adapter 20. Referring now to FIG. 2A, the union fitting 40 is in the form of an annular collar having an inner circumference 42 and an outer circumference 44. The inner circumference 42 of the distal end of the union fitting 40 is female threaded and is mounted to the compatibly male threaded outer circumference 46 of the top of the sounding tube 12. As the union fitting 40 is screwed onto the end of the sounding tube 12 proximal to the sounding tube adapter 20, a gasket 48 included in the union fitting 40 will tightly seal the union fitting 40 to the top of the sounding tube 12. The gasket 48 is disposed on the union fitting 40 in a position which is most proximal to the sounding tube 12 when the union fitting 40 is attached to the sounding tube 12. In this manner, the gasket 48 forms a tight seal between the union fitting 40 and the sounding tube 12 as the union fitting 40 is attached to the sounding tube 12. This seal aids in preventing the disruption of the microwave radar pulses, thereby preserving the accuracy of measurement. This tight seal also reduces the emission of noxious fumes from the sounding tube 12.

Following connection of the union fitting 40 to the sounding tube 12, the sounding tube adapter 20 may be attached to the union fitting 40. Still referring to FIG. 2A, the inner circumference 50 of the end of the sounding tube adapter 20 most proximal to the union fitting 40 is male threaded. The outer circumference 44 of the union fitting 40 on the end most proximal to the sounding tube adapter 20 is correspondingly female threaded. As such, the sounding tube adapter 20 may be screwed onto the union fitting 40. Once attached to the sounding tube 12, the measurement of fuel levels within the tank may be read from the display screen 28 disposed in the housing 14 of the level sensing apparatus 10.

Aside from pulse radar measurement, the apparatus 10 of the present invention also allows for measurement of fuel levels by the use of a plumb line, while retaining the accuracy of the level sensing apparatus 10 and minimizing the escape of noxious and hazardous fumes. Further to this aspect of the invention, the sounding tube adapter 20 includes an orifice 22 through its sidewall. This orifice 22 is preferably disposed below the location of the antenna 18 of the level sensing apparatus 10. This orifice 22 provides an opening through which a plumb line may be inserted to the interior of the sounding tube adapter 20. The plumb bob attached to the plumb line may then fall by force of gravity to the bottom of the sounding tube 12 to which the level sensing apparatus 10 is attached. Upon retraction of the plumb bob, the level of fuel may be measured from the moisture on the attached plumb line.

When the plumb line method of measurement is not in use, the orifice 22 of the sounding tube adapter 20 is sealed off by a cover 24 which prevents the escape of noxious fumes from the jet fuel tanks. In one embodiment of this invention the cover 24 may be in the form of a latch door 52, which includes a latch 54 and cotter pin 56. This latch door 52 is moveable between a first closed position and a second open position. In the first position, the latch 54 is closed and the cotter pin 56 secured, resulting in the latch door 52 forming a tight seal over the orifice 22 of the sounding tube adapter 20. Upon release of the cotter pin 56 and latch 54, the latch door 52 is moveably adapted to swing away from the wall of the sounding tube adapter 20 to a second position, thereby exposing the orifice 22 of the sounding tube adapter 20 for plumb line measurement. By use of this latch door 52, or other cover 24, to alternately cover and expose the orifice 22 of the sounding tube adapter 20, the apparatus 10 achieves the advantages of the present invention. First, when the latch door 52 is in a first closed position, the level sensing apparatus 10 can accurately measure the liquid level in fuel tanks. Second, when the latch door 52 is in a second open position, plumb line measurement may be used.

In an alternate embodiment of the invention the orifice 22 of the sounding tube adapter 20 may be enclosed by a sliding sleeve. This includes a sleeve which surrounds and circumferentially encompasses the sounding tube adapter 20. The sleeve is additionally movable in directions parallel to the longitudinal axis of the sounding tube adapter 20. By sliding this sleeve along the wall of the sounding tube adapter 20, the orifice 22 may be exposed for measurement by plumb line or sealed off to allow for accurate measurement by the level sensing apparatus 10 and to prevent the escape of noxious fumes. Therefore, in use, the present invention provides a method of measuring liquid levels in a tank without the disadvantages and drawbacks of methods and apparatus of the prior art.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A level sensing apparatus for attachment to a vessel to measure levels of contents in a tank of the vessel, said level sensing apparatus comprising:
    a housing;
    a transmitter disposed within and operatively connected to said housing;
    an antenna operatively connected to said transmitter for directing electrical and/or mechanical waves in a direction away from said transmitter, said antenna further adapted to receive electrical and/or mechanical waves; and
    a mounting system affixing the level sensing apparatus to a vessel, wherein said mounting system is adapted such that the mounting system can be placed in a first position while said transmitter is affixed to said vessel, wherein levels of contents in a tank can be measured with electrical and/or mechanical waves, or in a second position while said transmitter is affixed to said vessel, wherein levels of contents in a tank can be measured manually.

2. The apparatus of claim 1 wherein said mounting system includes a sidewall and has an orifice disposed through said sidewall.

3. The apparatus of claim 2 further comprising a cover in confronting relationship with and superimposed over said orifice.

4. The apparatus of claim 3, said cover being a movable latch door operatively sealing said orifice when said mounting system is in said first position, said latch door movable to said second position in order to expose said orifice.

5. The apparatus of claim 3, said cover being a movable sleeve operatively sealing said orifice when said mounting system is in said first position, said sleeve movable to said second position in order to expose said orifice.

6. In combination, a level sensing apparatus and a sounding tube, the combination comprising:
    a sounding tube affixed to a vessel; and
    a level sensing apparatus for attachment to said sounding tube for measuring the level of contents inside said sounding tube, said level sensing apparatus including a housing, a transmitter disposed within and operatively connected to said housing, an antenna operatively connected to said transmitter for directing electrical and/or mechanical waves in a direction away from said transmitter, said antenna further adapted to receive electrical and/or mechanical waves, and a mounting system for affixing the level sensing apparatus to said sounding tube, wherein said mounting system is adapted such that the mounting system can be placed in a first position while said transmitter is affixed to said vessel, wherein levels of contents in a tank can be measured with electrical and/or mechanical waves, or in a second position while said transmitter is affixed to said vessel wherein levels of contents in a tank can be measured manually.

7. The combination of claim 6 wherein said mounting system includes a sidewall and has an orifice disposed through said sidewall.

8. The combination of claim 7 further comprising a cover in confronting relationship with and superimposed over said orifice.

9. The combination of claim 8, said cover being a movable latch door operatively sealing said orifice when said mounting system is in said first position, said latch door movable to said second position in order to expose said orifice.

10. The combination of claim 8, said cover being a movable sleeve operatively sealing said orifice when said mounting system is in said first position, said sleeve movable to said second position in order to expose said orifice.

11. The combination of claim 10 wherein said sleeve is movably adapted to slide in a direction parallel to the longitudinal axis of said mounting system.

12. A method of securing a level sensing apparatus to a vessel, said method comprising the steps of:
    providing a level sensing apparatus having a transmitter and further having a mounting system for affixing the level sensing apparatus to a vessel, wherein said mounting system can be placed in a first position or a second position while said transmitter is affixed to the vessel, wherein levels of contents in a tank can be measured with electrical and/or mechanical waves when said mounting system is in said first position, and wherein levels of contents in a tank can be measured manually when said mounting system is in said second position; and affixing said level sensing apparatus to a vessel.

13. The method of claim 12, wherein affixing said level sensing apparatus to a vessel further comprises affixing said level sensing apparatus to a sounding tube.

14. The method of claim 12 wherein said mounting system includes a sidewall and has an orifice disposed through said sidewall.

15. The method of claim 14 further comprising a cover in confronting relationship with and superimposed over said orifice.

16. The method of claim 15, said cover being a movable latch door operatively sealing said orifice when said mounting system is in said first position, said latch door movable to said second position in order to expose said orifice.

17. The method of claim 15, said cover being a movable sleeve operatively sealing said orifice when said mounting system is in said first position, said sleeve movable to said second position in order to expose said orifice.

18. A method of measuring levels of contents in a tank of a vessel, the method comprising the steps of:

providing a level sensing apparatus affixed to a vessel, said level sensing apparatus having a housing, a transmitter disposed within and operatively connected to said housing, an antenna operatively connected to said transmitter for directing electrical and/or mechanical waves in a direction away from said transmitter, said antenna further adapted to receive electrical and/or mechanical waves, and a mounting system affixing the level sensing apparatus to a vessel, wherein said mounting system can be placed in a first position or a second position while said transmitter is affixed to said vessel, wherein levels of contents in a tank can be measured with electrical and/or mechanical waves when said mounting system is in said first position, and wherein levels of contents in a tank can be measured manually when said mounting system is in said second position;

placing said mounting system in said first position;

directing said electrical and/or mechanical waves to a liquid level surface of contents in said tank by the use of said level sensing apparatus;

receiving said electrical and/or mechanical waves from said liquid level surface in said tank by the use of said level sensing apparatus; and obtaining a corresponding measurement of said liquid level surface from a readout screen on said level sensing apparatus.

19. The method of claim 18 further comprising the step of placing said mounting system in said second position.

20. The method of claim 19 wherein said mounting system further comprises a sidewall and has an orifice disposed through said sidewall of the mounting system and a latch door superimposed over said orifice when said mounting system is in said first position.

21. The method of claim 20 wherein the step of moving said mounting system from said first position to said second position further comprises moving said latch door in order to expose said orifice.

22. The method of claim 21 further comprising the step of inserting a plumb bob with an attached plumb line through said orifice, whereby said plumb bob falls by force of gravity to the bottom of said tank.

23. The method of claim 22 further comprising the step of retracting said plumb bob.

24. The method of claim 23 further comprising the step of obtaining a corresponding measurement of said liquid level surface in said tank by measuring the level of moisture on said plumb line.

25. The method of claim 24 further comprising the step of moving said latch door from said second position to said first position to seal said orifice, in order to obtain accurate liquid level measurement by use of said level sensing apparatus.

26. A mounting system for affixing a level sensing apparatus to a vessel, said mounting system comprising an adapter having first and second ends, said first end adapted for attachment to a level sensing apparatus having a transmitter and said second end adapted for attachment to a vessel, wherein said adapter is further adapted to be placed in a first or a second position when said transmitter is affixed to a vessel, said first position allowing for measurement of levels of contents in a tank by electrical and/or mechanical waves, and said second position allowing for manual measurement of levels of contents in a tank.

27. The system of claim 26, wherein said adapter includes a sidewall and has an orifice disposed through said sidewall.

28. The system of claim 27 further comprising a cover in confronting relationship with and superimposed over said orifice.

29. The system of claim 28, said cover being a movable latch door operatively sealing said orifice when said adapter is in said first position, said latch door movable to said second position in order to expose said orifice.

30. The system of claim 29 wherein said latch door further includes a latch and cotter pin system for closing and locking said latch door in said first position in confronting relationship with and superimposed over said orifice.

31. The system of claim 28, said cover being a movable sleeve operatively sealing said orifice when said adapter is in said first position, said sleeve movable to said second position in order to expose said orifice.

32. The system of claim 31 wherein said sleeve is movably adapted to slide in a direction parallel to the longitudinal axis of said adapter.

33. A level sensing apparatus for attachment to a vessel to measure levels of contents in a tank of the vessel, said level sensing apparatus comprising:

a housing;

a transmitter disposed within and operatively connected to said housing;

an antenna operatively connected to said transmitter for directing electrical and/or mechanical waves in a direction away from said transmitter, said antenna further adapted to receive electrical and/or mechanical waves; and a mounting system affixing the level sensing apparatus to a sounding tube of a vessel, wherein the levels of contents in the tank may be measured with electrical and/or mechanical waves using the sounding tube while the level sensing apparatus remains affixed to the vessel, or may be measured manually using the sounding tube while the level sensing apparatus remains affixed to the vessel.

34. The apparatus of claim 33 wherein said mounting system includes a sidewall and has an orifice disposed through said sidewall.

35. The apparatus of claim 34 further comprising a cover in confronting relationship with and superimposed over said orifice.

36. The apparatus of claim 35, said cover being a movable latch door operatively sealing said orifice when said mounting system is in said first position, said latch door movable to said second position in order to expose said orifice.

37. The apparatus of claim 35, said cover being a movable sleeve operatively sealing said orifice when said mounting system is in said first position, said sleeve movable to said second position in order to expose said orifice.

38. A mounting system for affixing a level sensing apparatus to a vessel, said mounting system comprising an adapter having first and second ends, said first end adapted for attachment to a level sensing apparatus and said second end adapted for attachment to a sounding tube of a vessel, wherein the levels of contents in a tank of the vessel may be measured with electrical and/or mechanical waves using the sounding tube while the level sensing apparatus remains affixed to the vessel, or may be measured manually using the sounding tube while the level sensing apparatus remains affixed to the vessel.

39. The system of claim 38, wherein said adapter includes a sidewall and has an orifice disposed through said sidewall.

40. The system of claim 39 further comprising a cover in confronting relationship with and superimposed over said orifice.

41. The system of claim 40, said cover being a movable latch door operatively sealing said orifice when said adapter is in said first position, said latch door movable to said second position in order to expose said orifice.

42. The system of claim 41 wherein said latch door further includes a latch and cotter pin system for closing and locking said latch door in said first position in confronting relationship with and superimposed over said orifice.

43. The system of claim 40, said cover being a movable sleeve operatively sealing said orifice when said adapter is in said first position, said sleeve movable to said second position in order to expose said orifice.

44. The system of claim 43 wherein said sleeve is movably adapted to slide in a direction parallel to the longitudinal axis of said adapter.

* * * * *

UNITED STATES PATENT AND TRADEMARK OFFICE
CERTIFICATE OF CORRECTION

PATENT NO. : 6,538,598 B1
DATED : March 25, 2003
INVENTOR(S) : Neil T. Wilkie et al.

It is certified that error appears in the above-identified patent and that said Letters Patent is hereby corrected as shown below:

<u>Title page,</u>
Item [73], Assignee, "Ohmart-VEGA, Inc." should be -- Ohmart/VEGA Corporation --.

<u>Column 1,</u>
Line 9, "now allowed" should be deleted.
Line 63, "based on two other measurement" should be -- based on two other measurements --.

<u>Column 7,</u>
Line 55, "scope of applicant's general inventive concept" should be -- scope of applicants' general inventive concept --.

Signed and Sealed this

Fourth Day of November, 2003

JAMES E. ROGAN
*Director of the United States Patent and Trademark Office*